United States Patent [19]

Kegler et al.

[11] 4,306,689
[45] Dec. 22, 1981

[54] DEVICE FOR SUPPRESSING DEVIATIONS IN THE OUTPUT VOLTAGE OF A PRESSURE TRANSDUCER IN MAGNETIC TAPE RECORDERS CAUSED BY TEMPERATURE FLUCTUATIONS

[75] Inventors: Ernst Kegler, Munich; Franz J. Meyer, Emmering, both of Fed. Rep. of Germany

[73] Assignee: Siemens Aktiengesellschaft, Berlin & Munich, Fed. Rep. of Germany

[21] Appl. No.: 123,985

[22] Filed: Feb. 25, 1980

[30] Foreign Application Priority Data

Apr. 6, 1979 [DE] Fed. Rep. of Germany ....... 2914037

[51] Int. Cl.³ .................... G11B 15/06; G11B 23/12
[52] U.S. Cl. ...................................... 242/184; 73/204
[58] Field of Search ................... 242/182–184; 250/571; 226/97, 100; 73/204

[56] References Cited

U.S. PATENT DOCUMENTS

| | | | |
|---|---|---|---|
| 3,354,318 | 11/1967 | Wahlstrom | 250/571 |
| 3,540,643 | 11/1970 | Longland | 226/97 |
| 3,701,494 | 10/1972 | Proulx | 242/184 |

*Primary Examiner*—Leonard D. Christian
*Attorney, Agent, or Firm*—Hill, Van Santen, Steadman, Chiara & Simpson

[57] ABSTRACT

A device is disclosed for suppressing deviations in the output voltage of a pressure transducer in magnetic tape recorders caused by temperature fluctuations. A voltage dependent on the temperature of the pressure transducer is connected to the adjustable tap of a potentiometer connected between inputs of a differential amplifier. An operational amplifier compensates the output voltage of the pressure transducer with the output of the differential amplifier.

3 Claims, 2 Drawing Figures

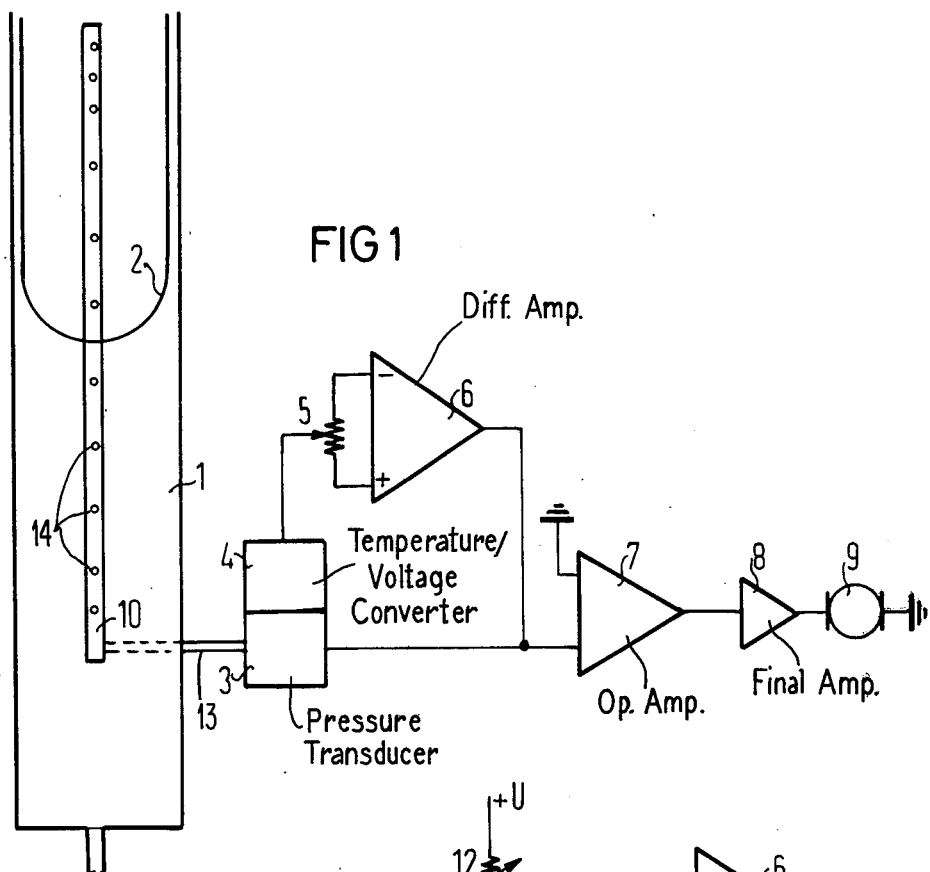
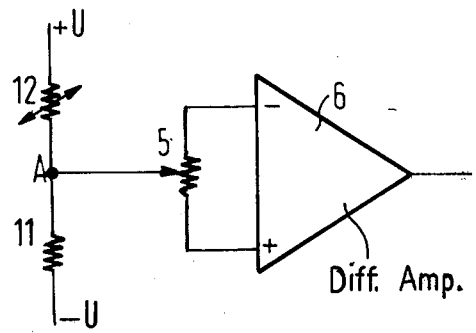

DEVICE FOR SUPPRESSING DEVIATIONS IN THE OUTPUT VOLTAGE OF A PRESSURE TRANSDUCER IN MAGNETIC TAPE RECORDERS CAUSED BY TEMPERATURE FLUCTUATIONS

BACKGROUND OF THE INVENTION

The invention relates to a device for disabling or suppressing deviations in the output voltage of a pressure transducer upon measurement of the pressure in the buffer chamber of magnetic tape recorders functioning with an analog control, said deviations of the output voltage being caused by temperature changes.

As a rule, magnetic tape recorders for data processing systems employ so-called buffer chambers in which a part of the magnetic tape is intermediately stored. This is shown in FIG. 6, for example, of "Elektronische Rechenanlagen", 4 month, 1968, pages 181–186, incorporated herein by reference. In such tape devices, one discriminates between digital control of the tape winding dependently of its exceeding or falling below barriers in the buffer chamber (usually light barriers), and analog control in which, for example, with the assistance of a pressure transducer, the pressure prevailing in a specific part of the buffer chamber, and dependent on the position of the tape loop in the buffer chamber, is measured and converted into an electrical magnitude, for example, a voltage.

On the one hand, the output voltage of such a pressure transducer depends on the pressure at its input, but, on the other hand, also depends on the prevailing ambient temperature. Accordingly, the case often occurs that different units of one and the same type of pressure transducer exhibit a temperature coefficient of varying size and, in addition thereto, a positive or negative temperature coefficient.

In magnetic tape devices with analog control, however, one strives to see that the band loop has its idle or normal position in the center of the buffer chamber and that a deviation of the band loop from this idle or normal position leads to a re-adjustment of the corresponding winding motor such that the tape loop which may have migrated from its idle or normal position is again brought into that position. If one were to employ pressure transducers with the properties mentioned above, then this would lead to the face that given heating of the device the tape loop will migrate from its normal position in the center of the chamber toward the top or toward the bottom. For the normal or idle position of the band, this in itself would not yet have any significance. An excursion from the normal position of the tape would be disadvantageous for the running operation of the magnetic tape device of this type in that the magnetic tape can no longer be accelerated to the desired degree in the one or other direction without reaching the limits of the buffer chamber.

A compensation of the temperature response of the pressure transducer is indeed possible and known, but only by means of individual measurement of each pressure transducer and by means of the selection of elements which are temperature-dependent in the opposite direction.

SUMMARY OF THE INVENTION

An object of the present invention is therefore to create a device for compensating deviations of the output voltage of a pressure transducer caused by temperature changes in which one need not take into consideration whether the pressure transducer employed exhibits a great or small or positive or negative temperature coefficient, respectively.

This is achieved according to the invention by means of a device for generating a voltage dependent on the temperature of the pressure transducer, by means of a differential amplifier with a potentiometer connected between its two inputs, the temperature-dependent voltage pending at the adjustable tap of said potentiometer, and by means of an operational amplifier whose input is connected, on the one hand, to the output of the differential amplifier and, on the other hand, to the output of the pressure transducer.

The device of the invention has the advantage that, given the structure of magnetic tape devices with analog control in which pressure transducers of the aforementioned type are employed, no expensive determination of the temperature coefficients of the output voltage of the pressure transducer employed is now required. Further, the individual dimensioning of compensation means is simplified in that the steepness and the direction of the compensation voltage for the output voltage of the pressure transducer can be set with a single potentiometer.

BRIEF DESCRIPTION OF THE DRAWINGS

FIG. 1 is a schematic illustration of the temperature control system of the invention for a magnetic tape device having a vacuum buffer chamber; and FIG. 2 is a schematic diagram of a preferred embodiment for a temperature/voltage converter device shown in FIG. 1.

DESCRIPTION OF THE PREFERRED EMBODIMENTS

The arrangement schematically illustrated in FIG. 1 shows a part of a vacuum buffer chamber 1 of a magnetic tape device in which a tape loop 2 is situated. A space or region 10 (mixing chamber) provided with small bores 14 leading to the buffer chamber is situated in a known manner in the back wall of the buffer chamber 1, the hose line 13 of a pressure transducer 3 opening into said space 10 in order to measure the pressure in the mixing chamber 10. As is well known from the previously cited article Elektronische Rechenanlagen, this pressure depends on the position of the tape loop 2 in the buffer chamber as shown in FIG. 1 such that more or less of the bore holes 14 of chamber 10 are subject to the pressure in the buffer chamber below the tape loop 2. The inventive device has a temperature/voltage converter chamber 10 are subject to the pressure in the buffer chamber below the tape loop 2 device 4 which generates a voltage dependent on the temperature of the pressure transducer 3. This voltage is supplied to the adjustable tap of a potentiometer 5 which is connected between the two inputs of a differential amplifier 6. The output of the differential amplifier 6, together with the output of the pressure transducer 3, is connected to the input of an operational amplifier 7 whose output signal controls the tape heel winding motor 9 for controlling the tape loop 2 in the vacuum buffer chamber 1 via a final amplifier 8.

FIG. 2 shows a particularly advantageous embodiment for the device 4. This consists of a thermistor 12 arranged on the pressure transducer 3. This thermistor 12 is electrically connected in series with a fixed resistor 11 between fixed voltages $+U$, $-U$, and at a junction A with the fixed resistor 11, the temperature-dependent voltage is tapped.

The device illustrated in FIG. 1 and particularly executed in the form of FIG. 2 functions as follows.

The voltage divider consisting of the thermistor 12 and the fixed resistor 11 is preferably dimensioned such that, given normal temperature at point A, a potential of zero volts prevails. In this state, the output voltage of the operational amplifier 7 is measured.

After heating of the pressure transducer and the thermistor 12 arranged on it to a random temperature lying in the permissible working range of the pressure transducer, the value measured at the output of the operational amplifier 7 is reset with the potentiometer 5 to the value measured given normal temperature. The height of the temperature in the admissible working range of the pressure transducer at which this re-adjustment ensues is without significance since both the output voltage of the pressure transducer as well as the resistance of the thermistor 12 change linearly with the temperature in this range. With the change of the adjustment of the potentiometer 5, thus two straight lines are brought into coincidence and it is therefore of no significance at which temperature this ensues. That which is essentially novel and the great advance of the subject matter of the application is to be seen in the particularly simple, universal adjustment possibility for the compensation voltage.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A device for suppressing temperature induced deviations of a pressure transducer, comprising: pressure transducer means for analog measurement of tape loop position in a buffer chamber of a magnetic tape device; means for generating a voltage related to a temperature of the pressure transducer means; a differential amplifier having two inputs and a potentiometer with an adjustable tap connected between said two inputs, the temperature-related voltage being coupled to said adjustable tap of said potentiometer; and an amplifier whose input is connected to the output of the differential amplifier and to an output of the pressure transducer, an output of said amplifier being coupled to means for controlling winding speed of the tape device.

2. A device according to claim 1 wherein the means for generating the temperature-related voltage comprises a thermistor arranged on the pressure transducer means, said thermistor being electrically connected in series with a resistor connected to a fixed voltage, and a temperature-related voltage being taken from a junction between the resistor and thermistor.

3. A system for temperature independent control of a tape loop buffer chamber in a magnetic tape device, comprising: a tape loop buffer chamber having means for producing a varying pressure dependent upon tape loop position therein; a pressure transducer means for measurement of said varying pressure; means for generating a voltage related to a temperature associated with the pressure transducer means; a differential amplifier with a potentiometer having an adjustable tap connected between its two inputs, the temperature-related voltage being coupled to said adjustable tap of the potentiometer; an amplifier and means connecting an input of the amplifier to the output of the differential amplifier; means connecting an output of the pressure transducer to said amplifier; and an output of said amplifier being connected to means for controlling tape speed.

* * * * *